July 11, 1950        C. A. CRAIG        2,514,938
FISHING LURE
Filed July 14, 1945
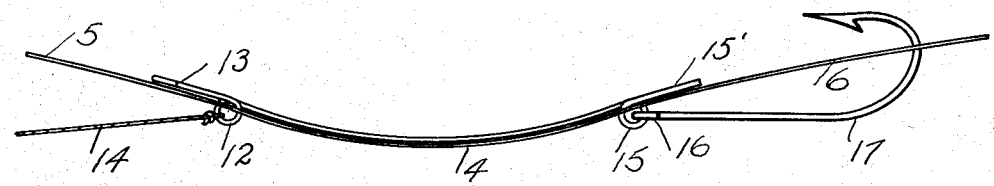
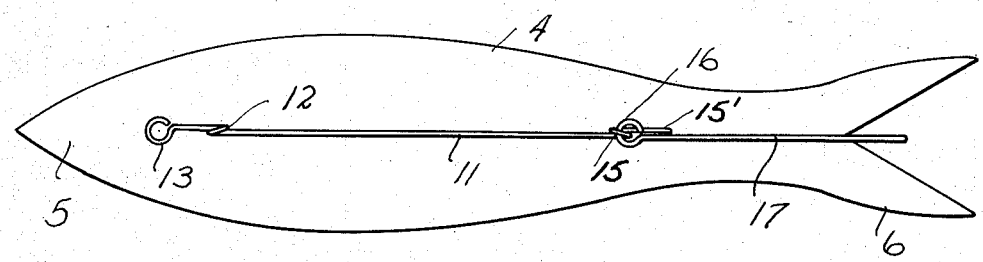
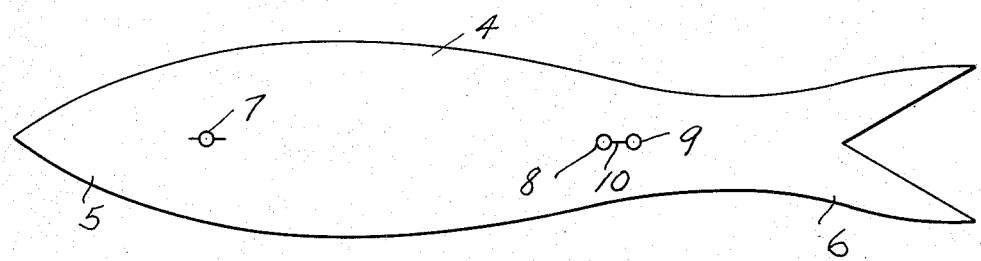
INVENTOR.
C. A. CRAIG
BY Edward O. Healy
ATTORNEY Patented July 11, 1950

2,514,938

UNITED STATES PATENT OFFICE 2,514,938

FISHING LURE

Charles A. Craig, Santa Barbara, Calif.

Application July 14, 1945, Serial No. 605,043

1 Claim. (Cl. 43—42.09)

This invention relates to improvements in fishing lures and has particular reference to a lure that simulates in appearance a minnow or sardine and the action of a fish in its furtive and darting movements in the water.

The principal object of the invention is the employment in the lure of a two piece interchangeable construction, one portion comprising a highly ornamented plastic body that has the appearance of a small fish of the type described, and the other portion comprising a stabilizer element made of a single piece of spring wire that is detachably secured to the fish body, and is provided with means for receiving the lead or line and the hook element of the lure.

A further object of the invention is the provision of means in the stabilizer wire to hold the tail of a fish in a substantially horizontal position, and means to control the rapidity of the vibration of the body portion of the lure.

An additional object of the invention is the provision of a slightly exaggerated width of the tail spread of the lure to permit freedom of action of the hook and to also conceal the hook.

A further object of the invention is the provision of a lure of the character described that is simple in construction, economical to manufacture, easy to assemble, positive in operation and strong and durable.

Other objects and advantages will be apparent during the course of the following description.

In the accompanying drawing wherein for the purpose of illustration is shown the preferred embodiment of the invention, Fig. 1 is an edge view of the lure constructed in accordance with my invention, Fig. 2 is a top plan view of the same disclosing the transparent body of the lure with the stabilizer wire visible therethrough, and Fig. 3 is a similar view with the stabilizer element and the hook removed to more clearly illustrate the spaced openings provided in the pliable plastic body of the lure.

Referring to the drawing, the numeral 4 indicates the body portion of the lure of the present invention that has a head 5 and a tail 6. The body is preferably made of a strong, pliable transparent plastic material and is provided adjacent the head portion with an opening or slot 7, and adjacent the tail portion with a pair of openings 8 and 9 connected by a slit 10.

To said body a stabilizer element 11 is detachably secured. This element comprises a single piece of curved spring wire, the curvature thereof conforming to the contour of the body of the lure, as illustrated to advantage in Fig. 1. It will be noted that the element 11 is bent adjacent its front end to provide a loop 12 and then continues into a flattened head 13 that comes into play when currents bend the head back, the stabilizer or spring wire then functioning to stiffen the head 5, thus causing a fast quivering or vibrating fishlike action. The loop 12 is capable of passing through the slot 7 and has connected thereto a line 14. The wire is also bent adjacent its opposite end to provide an eye 15 and an extension 15', the eye passing through the slit 10 and serving as the medium to receive the ring 16 of the hook 17. In this instance the extension 15' functions to prevent the eye from pulling through the body and also holds the tail as positioned down when fast action is needed. This construction provides a pivotal action and places the hook 17 in a striking position, which hook is positioned between the V of the tail portion.

It will be obvious since the line is secured to the loop 12 and the ring 16 is secured to the eye 15, that when the loop and eye both pass through the respective openings and the slit accidental displacement of the stabilizer from the body of the lure will be eliminated. When it is desired to remove the stabilizer to employ a color combination of different characters of the lure or fish body, it is only necessary to remove the line from the loop 12 and to slightly spring the ring 16 of the hook and thus the ring is readily released from the eye 15. The loop 12 and the eye 15 will then pass through the opening 7 and the slit 10 in the body 4, and a new type of lure can be employed.

As many as 25 different color combinations are available in the body of the lure to obtain the best results under various fishing conditions.

By virtue of the construction employed, namely, the arrangement of means for fastening the stabilizer to the fish body, as recited, the tail portion will be held in a substantially horizontal position and the said arrangement will govern the rapidly of the vibration of the body due to the pressure exerted against the top of the head and increasing or stiffening its resistance to the water as the pressure is increased or decreased by the application of more or less line tension. The thin pliant composition of the material employed in the body of the lure affords a degree of flexibility and rhythm of action. The lure is thus enabled to respond instantaneously to the slightest change of water pressure. At the same time this construction affords the operator the choice of several changes of pace that vary from a streaking dart to a slow or lazy swimming motion not unlike that of the living counterpart of the lure.

It might be mentioned that the device serves to its best advantage when drawn through the water with an irregular or surging motion. Due to the flexibility of the nose or frontal extremity the lure will readily quiver or vibrate with a quick shimmy or pivotal swimming motion, together with a darting action in any direction the nose is pointing at the instant the line is tightened. Operating against the surge of swells or seas, as in trolling from power boats, the lure readily reacts most naturally in a swimming, darting, illusive and scintillating manner that very closely resembles the transparency of a sardine or minnow, offering at the same time a very colored flash or momentary silhouette of its fishlike body while holding the more tangible outline of its camouflaged identity. In other words, by virtue of the construction employed the lure presents a positive fishlike action which at no time affords the opportunity of close inspection. The lure does not reflect the whole of the flood of sunlight but gathers and transmits a more subtle fleck of light, from many diversified positions, but never reflecting a brazen or metallic flash, thereby causing the fish to become aware of the synthetic nature of the lure.

It is to be understood that the form of my invention herewith shown and described is to be taken as a preferred example of the same, and that various changes relative to the shape, size, material and arrangement of parts may be readily resorted to without departing from the spirit of the invention or the scope of the subjoined claim.

Having thus described my invention, I claim:

A fishing lure comprising a curved, flexible, transparent, plastic member simulating the head, tail and body portion of a fish of the minnow specie, the head portion having a single opening therein, and the tail portion having a pair of spaced openings, and being of a V-shaped configuration and a slit interposed between the pair of spaced openings, a single strand of wire conforming to the curvature of the body member, a loop provided in said wire adjacent one end thereof, a second loop provided in said wire adjacent the opposite end thereof, the respective loops extending through the opening of the head portion and in the slit of the tail portion of said plastic member, respectively, and serving as a means for detachably securing the wire to the head and tail portion of said lure, extensions continuing from said loops for engaging the head and tail portions, and a fish hook secured at one end to one of the spaced loops and positioned and retained adjacent its opposite end in the V of said tail portion.

CHARLES A. CRAIG.

REFERENCES CITED

The following references are of record in the file of this patent:

UNITED STATES PATENTS

| Number | Name | Date |
| --- | --- | --- |
| Re. 19,671 | Jordan | Apr. 20, 1935 |
| 1,258,213 | Grothkopf | Mar. 15, 1918 |
| 1,273,425 | Tuttle | July 23, 1918 |
| 1,345,600 | Keeling | July 6, 1920 |
| 1,867,964 | Bott | July 19, 1932 |
| 1,977,003 | Maynard | Oct. 16, 1934 |
| 2,149,464 | Potts | Mar. 7, 1939 |
| 2,208,008 | McLaughlin | July 16, 1940 |
| 2,215,428 | Place | Sept. 17, 1940 |
| 2,290,433 | Jeffers | July 21, 1942 |
| 2,298,691 | Greggains | Oct. 13, 1942 |
| 2,053,954 | Marsh | Sept. 8, 1936 |
| 2,341,467 | Nedell | Feb. 8, 1944 |